United States Patent

Redekop

Patent Number: 5,785,128
Date of Patent: Jul. 28, 1998

[54] FIELD MARKER

[76] Inventor: John K. Redekop, P.O. Box 136, Plum Coulee, Manitoba, Canada, ROG 1R0

[21] Appl. No.: 617,351

[22] Filed: Mar. 18, 1996

[51] Int. Cl.⁶ .................................................. A01B 69/02
[52] U.S. Cl. .......................................... 172/126; 172/271
[58] Field of Search .................................... 172/126, 271

[56] References Cited

U.S. PATENT DOCUMENTS

| | | | |
|---|---|---|---|
| 4,030,551 | 6/1977 | Boetto et al. | 172/126 |
| 4,063,597 | 12/1977 | Day | 172/126 |
| 4,379,491 | 4/1983 | Riewerts et al. | 172/456 X |
| 4,825,957 | 5/1989 | White et al. | 172/126 |
| 4,986,367 | 1/1991 | Kinzenbaw | 172/126 |
| 5,408,756 | 4/1995 | Wahls | 172/126 X |
| 5,425,427 | 6/1995 | Haugen | 172/126 |
| 5,485,796 | 1/1996 | Bassett | 172/126 X |
| 5,542,190 | 8/1996 | Wahls | 172/126 X |

FOREIGN PATENT DOCUMENTS

| | | |
|---|---|---|
| 1202529 | 4/1986 | Canada. |
| 1300433 | 5/1992 | Canada. |

OTHER PUBLICATIONS

John Deere 7000 Conservation 4–Row and 6–Row Narrow Max–Emerge Drawn Planters Operator's Manual.

*Primary Examiner*—Terry Lee Melius
*Assistant Examiner*—Christopher J. Novosad

[57] ABSTRACT

A field marker for attachment to a farm implement to form a groove in the ground for guiding a farmer as the implement is towed or driven across a field includes an inner wing section pivotally connected to a lateral end of the implement and an outer arm section pivotally connected to the distal end of the wing section. The wing section may be pivoted hydraulically from a working position extending outwardly from the implement to a stowage position parallel to the implement. The arm section may be pivoted hydraulically generally vertically relative to the wing section through an angle of about 190° between its stowage position and its working position. The arm section is provided with a spring-loaded breakaway mechanism that permits an outer arm portion of the arm section to pivot rearwardly of an inner arm portion of the arm section should the arm section encounter an immovable obstruction. The breakaway mechanism can be easily and quickly reset after activation without having to replace any parts.

12 Claims, 3 Drawing Sheets

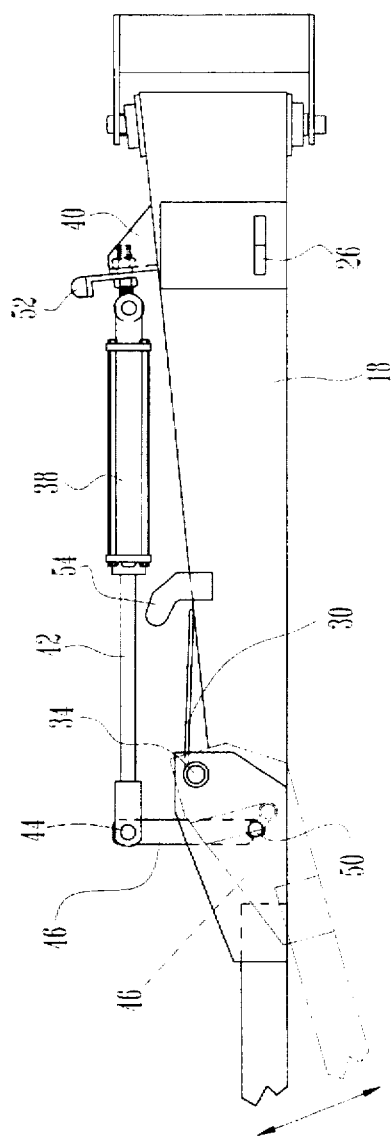
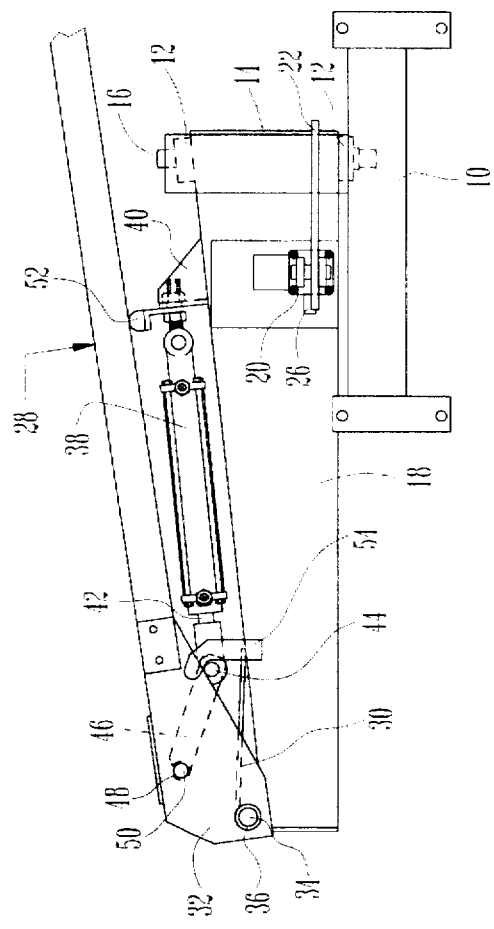

FIELD MARKER

The present invention relates in general to a field marker for use with agricultural implements such as planters, and in particular to a field marker having unique folding and breakaway features.

BACKGROUND OF THE INVENTION

Field markers are well known and are used to define a guide line for a farmer to follow while he is planting or working a field. The marker is provided at the end of a long foldable arm, which arm is in turn mounted at one side of the implement being used for planting or plowing. The marker creates a furrow or groove in the ground during the planting or plowing operation and the farmer is then able to follow that groove as he drives his tractor in the opposite direction for the next pass. Typically a farm implement will have a field marker mounted to each lateral side of the implement so that a groove can be placed in the soil on either side of the implement, depending on the direction of travel or the position of the implement in the field when the operation commences.

There are numerous patents directed to field markers, most of which describe markers using a rotatable cutting wheel or disc mounted at the distal end of an elongated arm, which arm is pivotally mounted to the lateral side of the implement so that the arm can be folded out of the way to permit travel of the implement to and from the field. In most cases the arm is pivoted for movement from an operating position, in which the arm is angled downwardly from the implement so that the disc will cut into the ground, to a travel position in which the arm is pivoted to a generally vertical orientation. In some cases the arm is formed in two or three sections, each of which can pivot relative to an adjacent section so as to reduce the length of the folded arm. This can be important when the implement itself is foldable to reduce its width for travelling purposes.

Typical field markers, such as those described in U.S. Pat. Nos. 4,063,597; 5,408,756; and 5,425,427 and in Canadian Patents. nos. 1,202,529 and 1,300,433 utilize four-bar linkages or cable mechanisms to coordinate the folding of an outer arm portion relative to an inner arm portion when the arm is folded to or from its operating condition. These systems require adjustment from time to time and are complex to design, maintain and optimize. Some markers, such as those or U.S. Pat. No. 4,825,957 and Canadian Patent No. 1,202,529 also illustrate breakaway systems which allow the arm to compensate for obstacles that the arm or the disc might encounter during operation. Such breakaway systems might entail the use of a frangible bolt or other member or the use of a spring loaded tension element. These mechanisms are expensive to build, a nuisance to use and are not sufficiently reliable to ensure that the disc or the arm will not be damaged when an immovable obstacle is encountered.

There is a need for a new field marker which is easily folded to provide a minimum size for travelling, that is simple and reliable to operate, and which will have a breakaway feature that operates every time without requiring expensive and time-consuming operations to restore it to its operative condition.

SUMMARY OF THE INVENTION

The present invention provides a new and unique field marker that satisfies the requirements stipulated above. The marker of this invention has an inner wing section that is mounted to the lateral end member of an implement frame for pivotal movement relative thereto, the pivotal movement being controlled hydraulically. The pivotal movement is such that the inner wing section takes up a folded position that is preferably generally horizontal relative to the ground when the implement is in its working position. An outer arm section is pivotally hinged to the distal end of the wing section and is controlled hydraulically so that it will pivot between stowage and working positions through an angle of about 190° in a generally vertical plane relative to the wing section. Furthermore the outer arm section is provided with a breakaway hinge near the pivotal connection to the inner wing section, the breakaway hinge being spring loaded and constructed in such a manner that the hinge connection can be easily re-established should the arm encounter an immovable object and the breakaway hinge be activated. No parts will break and no parts will have to be replaced if the breakaway mechanism is used.

The field marker of this invention is designed so that it can be used on either side of the implement with which it is to be used and so that it can be positioned at the front or the rear of the implement frame end as may be dictated by the construction of the implement.

Broadly speaking therefore the present invention may be considered as providing a field marker for use with a farm implement having a frame portion including laterally spaced frame ends to which the marker can be secured, the field marker comprising: an inner wing section having proximal and distal ends; means pivotally connecting the proximal end of the wing section to an implement frame end; first hydraulic cylinder means connected between the implement frame end and the wing section for pivoting the wing section about the pivot means between operating and storage conditions; an outer arm section having proximal and distal ends; means pivotally connecting the arm section at its proximal end to the distal end of the wing section; second hydraulic cylinder means connected between the wing section and the arm section for pivoting the arm section relative to the wing section; a marker disc rotatably mounted to the distal end of the arm section; and breakaway means within the arm section adjacent the proximal end thereof for permitting inner and outer portions of the arm section to pivot relative to each other should the disc or the arm section encounter an immovable object.

BRIEF DESCRIPTION OF THE DRAWINGS

FIG. 2 is a partial elevation of the hinge connection between the wing section and the arm section.

FIG. 3 is a partial elevation of the hinge connection of FIG. 2 shown in the retracted or stowed condition.

DESCRIPTION OF THE PREFERRED EMBODIMENT

Figure 1:
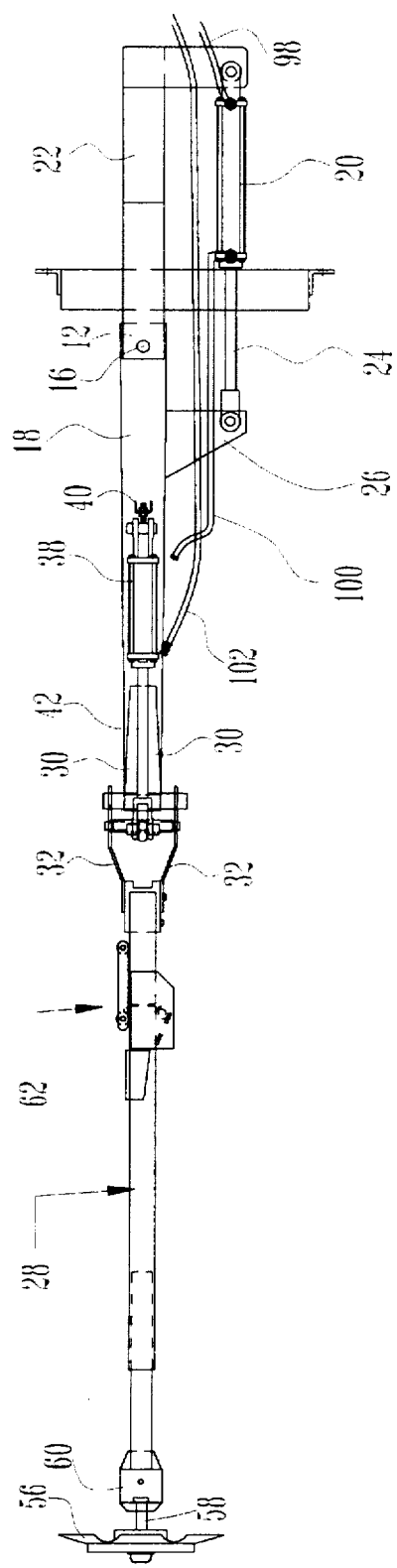
FIG. 1 is a plan view of the field marker of this invention, shown in the extended position.
Figure 1A:
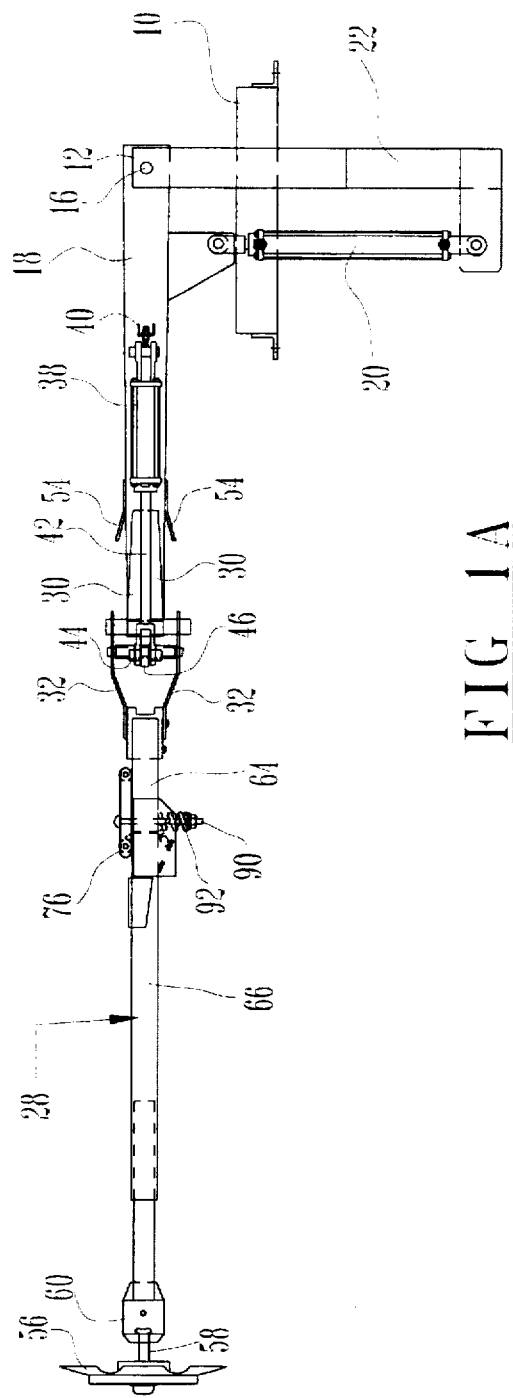
FIG. 1A is a plan view of the field marker of this invention shown in a partially stowed condition.

With reference to FIGS. 1, 1A and 3 there is shown a mounting bracket 10 which is attached in any conventional manner, as by U-bolts, to the end fame member (not shown) of an air seeder, planter, or other implement with which the field marker is to be used. Upper and lower lugs 12 are welded to a vertical support 14 which in turn is welded to the bracket 10, and a generally vertically oriented pin 16 extends through the lugs 12 and the proximal end of an elongated wing section 18 so as to pivotally connect the wing section to the bracket 10 and hence to the implement frame. Hydraulic cylinder 20 is connected at one end to an extension portion 22 of the bracket 10 and the rod 24 thereof is connected to a mounting lug 26 on a side of the wing section 18. The cylinder 20 can be retracted or extended so as to rotate the wing section 18 relative to the bracket 10 between folded and extended positions. The wing section 18 is preferably formed from tubular high tensile steel with the sides converging from the proximal end to the distal end thereof. The bottom of the wing section is generally normal to the pin 16 and the top surface slopes downwardly relative to the bottom from the proximal end to the distal end.

At the distal end of the wing section is a pivotal connection for the proximal end of the outer arm section 28, the connection involving a pair of generally triangular brackets 30 welded to the top surface of the wing section 18 and a pair of elbow brackets 32 secured to the adjacent end of the arm section 28. The elbow brackets 32 are pivotally connected to the triangular brackets 30 by a pivot pin 34 extending through journal bearings 36 held in the triangular brackets 30 so that the arm 28 can pivot vertically about the pin 34 between its working and stowage positions. Folding of the arm 28 relative to the wing section 18 is achieved by a hydraulic cylinder 38 attached at one end thereof to a lug 40 on the top surface of the wing section 18. The rod 42 of the cylinder is pivotally connected by a pin 44 to one end of an elongated solid link 46, the opposite end of which is welded to a bushing 48 through which a pin 50 extends. The pin 50 is welded at its ends to the elbow brackets 32 below the level of the pivot pin 34 and the bushing 48 is welded to the pin 50. When the cylinder 38 is retracted the pull on the upper end of the link 46 will cause the elbow brackets 32, and the arm 28 attached thereto, to rotate on the pin 34 until the arm overlies the wing section 18. When the arm is overlying the wing section 18 it will rest on a rubber or resilient pad 52 attached to the lug 40.

A pair of latch plates 54 welded to opposite sides of the wing section 18 extend above the top surface of the wing section and the upper ends thereof project forwardly. The pin 44 has its ends projecting laterally past the link 46 50 that when the cylinder 38 is fully retracted the projecting ends of the pin 44 will fit under the extended upper ends of the plates 54 so as to prevent the arm 28 from raising relative to the wing section 18. When the cylinder 38 is extended the ends of the pin 44 will first of all travel forwardly sufficiently to exit the plates 54 so that the arm can then be rotated about the pin 34. Full rotation of the arm 28 will take it through about 190° from its stowage position overlying the wing section 18 to its working position in which it extends downwardly from the distal end of the wing section towards the ground. This position is shown in part in dotted lines in FIG. 2.

FIGS. 1 and 1A show the distal end of the arm 28 wherein a rotatable marker wheel or disc 56 is mounted to a shaft 58 which in turn is attached to an adjustable bracket 60 at the end of the arm. As is common with field markers the wheel 56 will rotate during operation of the marker so as to create a groove in the ground, which groove can be followed by the farmer on his next pass.

Figure 4:
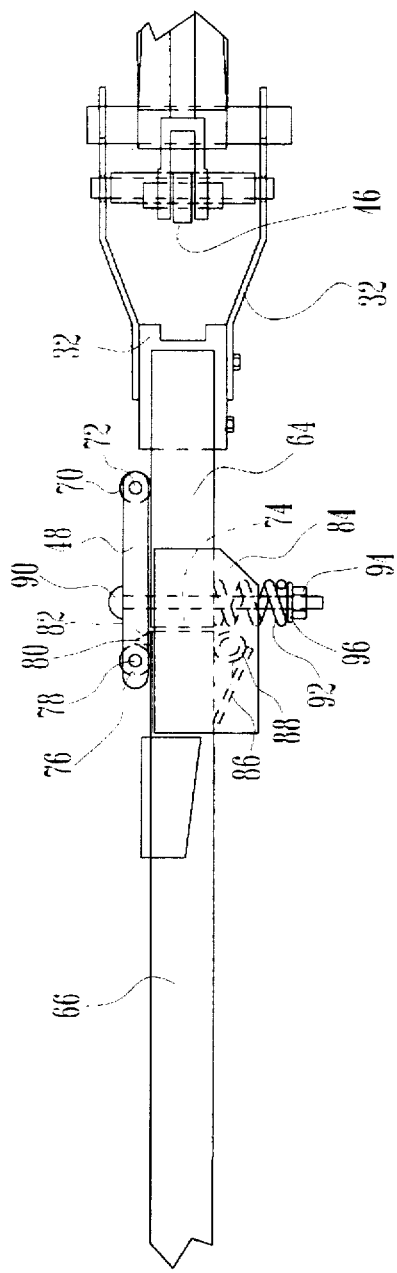
FIG. 4 is a partial elevation of the breakaway mechanism of this invention.
Figure 5:
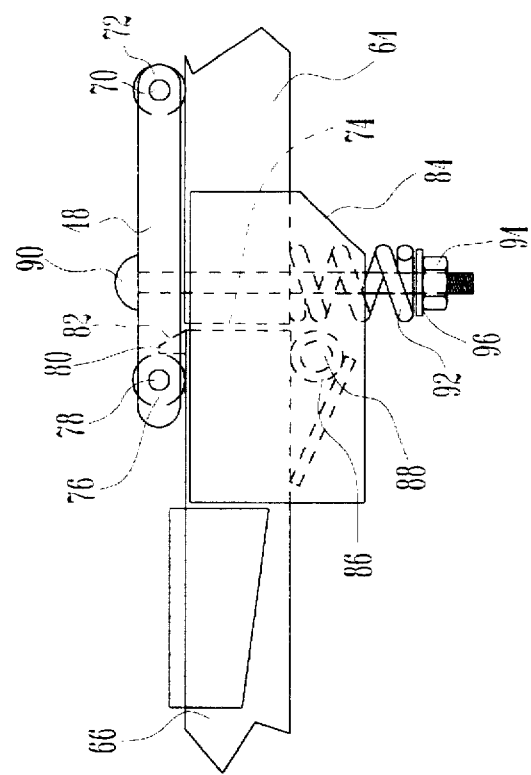
FIG. 5 is an enlarged partial elevation of the breakaway mechanism of this invention.

The breakaway mechanism 62 of this invention will now described with particular reference to FIGS. 4 and 5. As is seen therein the arm section 28 includes an inner portion 64 and an outer portion 66 connected to the inner portion by the breakaway mechanism of the invention. As seen, the inner portion 64 is substantially shorter than the outer portion 66, both portions having distal and proximal ends, with the distal end of the inner portion being pivotally connected to the proximal portion of the outer portion. A link 68 is pivotally connected to a journal 70 mounted to the forward side face of the arm portion 64 by a pin 72. The link 68 extends outwardly across the joint 74 between the inner and outer arm portions and has a roller 76 attached thereto by another pin 78. A latch member 80 in welded to the side face of the outer arm portion 66 adjacent the roller 76 and has a bevelled or sloping face 82 thereon.

Brackets 84 are welded to the top and bottom surfaces of inner arm portion 64 and extend past and overly the joint 74 between the two arm portions. A triangular lug 86 welded to the rear face of the outer arm portion 66 adjacent the inner end thereof receives a pin 88 that serves to pivotally connect the outer arm portion 66 to the inner arm portion 64.

The link 68 has a hole drilled therethrough for reception of a headed bolt 90, there being a mating hole extending through the inner arm portion 64 so that the bolt 90 can pass therethrough and project beyond the opposite side of the inner arm portion 64. A compression spring 92 slides over the exposed portion of the bolt 90 and is held in compression against the adjacent side of the inner arm portion 64 by a nut 94 threaded onto the threaded end of the bolt 90 and bearing against a washer member 96. The nut 94 can be tightened or loosened to adjust the force required to activate the breakaway mechanism. When the arm 28 or the disc wheel 56 contacts an object that might otherwise damage the field marker while travelling in the direction A the force imparted on the arm 28 will cause it to tend to rotate in the direction B about the pivot pin 88. If the object is not particularly big the wheel may just ride over it. If the object is larger, such as a stump or a large rock, the arm 28 will tend to rotate further in the direction B and the roller 76 will ride over the latch 80 against the spring force exerted by the spring 92. Once the roller 76 has ridden over the latch 80 the arm portion 28 is free to rotate rearwardly on the pivot pin 88 until the arm has passed the object. When the object has been successfully passed the operator can bring his equipment to a halt and then rotate the outer arm portion 66 forwardly on the pivot pin 88 relative to the inner arm portion 64 until the roller 76 rides along the sloping face 82 and again is positioned behind the latch 80 so that planting and marking the field can resume.

When it is desired to move the field marker of this invention between its stowage and working conditions the operator need only activate a single hydraulic control to initiate movement. Hydraulic fluid under pressure will flow along the line 98 (FIG. 1) from a reservoir to the cylinder 20 so that it will extend to rotate the wing section 18 outwardly from its stowage position adjacent the implement. The extending cylinder will cause hydraulic fluid to flow under pressure from the opposite end of the cylinder 20 along the line 100 to the proximal end of the cylinder 38 causing that cylinder to extend simultaneously. The arm section 28 will thus move to the extended condition of FIG. 1. If hydraulic fluid is caused to flow under pressure along the line 102 to the other end of the cylinder 38 that cylinder will retract so as to rotate the arm section 28 through about 190° until the arm section is generally parallel to and overlying the wing section 18. Simultaneously the cylinder 20 will retract due to hydraulic fluid flowing back along line 98 so as to pivot the wing section about the pin 16 until the wing section is generally parallel to the direction of travel of the implement.

When the arm section 28 overlies the wing section 18 it rests on the rubber pad 52, with the ends of the pin 44 positioned under the projecting ends of the plates 54. This fully retracted or folded condition of the outer arm section relative to the inner wing section is seen in FIG. 3. During retraction the weight of the arm section has helped to force the hydraulic fluid to flow along the line 100 to the cylinder 20 to aid in rotation of the wing section and, furthermore, the weight of the arm section and its influence on the hydraulic circuit helps to ensure that the arm section remains in its retracted or stowage condition and will not inadvertently move away therefrom. It should be noted that in FIG. 1A the outer arm section 28 is shown as being still extended relative to the inner wing section 18 even though the wing section is shown as being rotated to its stowage condition relative to the implement and the mounting bracket 10.

It is seen from the above that the field marker of this invention is not complex in its construction, that it is fully operated hydraulically using the hydraulic system of the implement or a tractor, and that it provides an effective and simple breakaway system that can be easily reset by the operator after encountering an obstacle that activated the breakaway system. The preferred construction of the invention has been described but it is understood that skilled workmen in the art could effect changes thereto without departing from the spirit of the invention. Accordingly the protection to be afforded this invention is to be determined from the scope of the claims appended hereto.

I claim:

1. A field marker for use with a farm implement having a frame portion including laterally spaced frame ends to which the marker can be secured, said field marker comprising: an inner wing section having proximal and distal ends; first pivot means pivotally connecting said proximal end of said inner wing section to an implement frame end; first hydraulic cylinder means connected between said implement frame end and said inner wing section for pivoting said inner wing section about said first pivot means between operating and stowage conditions; an outer arm section having an outer arm portion pivotally connected to an inner arm portion which is substantially shorter than said outer arm portion, each arm portion having proximal and distal ends; second pivot means pivotally connecting said proximal end of said inner arm portion to said distal end of said inner wing section; second hydraulic cylinder means connected between said inner wing section and said inner arm portion for pivoting said outer arm section relative to said inner wing section; a marker disc rotatably mounted to said distal end of said outer arm portion; and breakaway means within said arm section adjacent said proximal end of said outer arm portion and said distal end of said inner arm portion for permitting said inner and outer portions of said outer arm section to pivot relative to each other should said disc or said outer arm section encounter an immovable object and to be readily realigned following such relative pivoting.

2. The field marker of claim 1 wherein: said inner wing section has side walls converging from the proximal end to the distal end, a bottom wall generally normal to said first pivot means, and a top wall sloping downwardly relative to said bottom wall from said proximal end to said distal end; said first pivot means includes a mounting bracket removably attachable to a frame end of said farm implement, a vertically extending support member, vertically spaced apart lugs on said support member, and a first pivot pin extending vertically from an upper one of said lugs through said inner wing section at the proximal end thereof and through a lower one of said lugs; and wherein one end of said first hydraulic cylinder means is pivotally connected to a lateral extension of said mounting bracket and the other end of said first hydraulic cylinder means is connected pivotally to an adjacent side wall of said inner wing section.

3. The field marker of claim 2 wherein: said second pivot means includes a pair of elbow brackets secured to said proximal end of said inner arm portion and extending towards and overlapping said distal end of said inner wing section; triangular bracket means on the top wall of said inner wing section at said distal end thereof; and a pivot pin extending between said elbow brackets and said triangular bracket means.

4. The field marker of claim 3 wherein: said second hydraulic cylinder means is pivotally connected at one end thereto to a mounting lug on said top wall of said inner wing section and is pivotally connected at the other end thereof to one end of a link member; the other end of said link member is secured to a transversely extending bushing; and said bushing is secured to a pin which extends between said elbow brackets below and outwardly of said pivot pin extending between said elbow members and said triangular bracket means.

5. The field marker of claim 4 wherein said marker disc is rotatably and adjustably mounted to a shaft fixed to said distal end of said outer arm portion.

6. The field marker of claim 4 wherein said breakaway means comprises: a breakaway link pivotally connected at one end to a lug on a forward facing wall of said inner arm portion, said breakaway link extending outwardly to overly a section of said outer arm portion and having a roller member rotatably mounted at the other end thereof; a latch member fixed to a forward facing wall of said outer arm portion and abutting against said roller member within the length of said breakaway link; a bolt member extending rearwardly through said breakaway link and said inner arm portion, with a portion thereof projecting rearwardly from a rear facing wall of said inner arm portion; a compression spring mounted to the projecting portion of said bolt member and held against said rear facing wall by a nut threaded on said bolt member against a washer abutting said spring; and means adjacent the rear facing wall of said outer arm portion for pivotally connecting said outer arm portion to said inner arm portion.

7. The field marker of claim 6 wherein a pair of plate members are affixed to top and bottom walls of said inner arm portion so as to project rearwardly and outwardly of said inner arm portion; a lug member is affixed to a rear wall of said outer arm portion so as to extend between said plate members; and a pivot pin extends generally vertically through said plate members and said lug member to pivotally connect said outer arm portion to said inner arm portion for rearward pivoting movement of said outer arm portion relative to said inner arm portion upon activation of said breakaway mechanism.

8. The field marker of claim 7 wherein said latch member has a sloping outer surface facing away from said roller member.

9. The field marker of claim 1 comprising a hydraulic circuit including a control member and reservoir, a first flow line extending from said reservoir to a first end of said first hydraulic cylinder means, a second flow line extending from a second end of said first hydraulic cylinder means to a first end of said second hydraulic cylinder means, and a third flow line extending from a second end of said second hydraulic cylinder means back to said control member and reservoir.

10. A breakaway mechanism for permitting rearward movement of a first arm portion of an elongated arm section relative to a second arm portion thereof upon said first arm portion striking or being struck by an object, comprising: a breakaway link pivotally connected at one end to a lug on a forward facing wall of said second arm portion, said breakaway link extending outwardly to overly a section of said first arm portion and having a roller member rotatably mounted at the other end thereof; a latch member fixed to a forward facing wall of said first arm portion and abutting against said roller member within the length of said breakaway link; a bolt member extending rearwardly through said breakaway link and said second arm portion, with a portion thereof projecting rearwardly from a rear facing wall of said second arm portion; a compression spring mounted to the projecting portion of said bolt member and held against said rear facing wall by a nut threaded on said bolt member against a washer abutting said spring; and means adjacent the rear facing walls of said first and second arm portions for pivotally connecting said second arm portion to said first arm portion.

11. The breakaway mechanism of claim 10 wherein a pair of plate members are affixed to top and bottom walls of said second arm portion so as to project rearwardly and outwardly of said second arm portion; a lug member is affixed to a rear wall of said first arm portion so as to extend between said plate members; and a pivot pin extends generally vertically through said plate members and said lug member to pivotally connect said first arm portion to said second arm portion for rearward movement of said first arm portion relative to said second arm portion upon activation of said breakaway mechanism.

12. The breakaway mechanism of claim 11 wherein said latch member has a sloping outer surface facing away from said roller member.

* * * * *